United States Patent
Chaurasia

(10) Patent No.: US 7,149,929 B2
(45) Date of Patent: Dec. 12, 2006

(54) METHOD OF AND APPARATUS FOR CROSS-PLATFORM CORE DUMPING DURING DYNAMIC BINARY TRANSLATION

(75) Inventor: Rajesh Kumar Chaurasia, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 10/647,142

(22) Filed: Aug. 25, 2003

(65) Prior Publication Data

US 2005/0050389 A1    Mar. 3, 2005

(51) Int. Cl.
*G06F 11/00* (2006.01)

(52) U.S. Cl. .................... 714/38; 717/134; 717/138

(58) Field of Classification Search ............ 717/134, 717/138; 714/38
See application file for complete search history.

(56) References Cited

U.S. PATENT DOCUMENTS

| | | | |
|---|---|---|---|
| 5,680,584 A * | 10/1997 | Herdeg et al. | 703/22 |
| 6,681,348 B1 | 1/2004 | Vachon | |
| 6,694,457 B1 * | 2/2004 | McKee | 714/38 |
| 6,901,583 B1 * | 5/2005 | Park | 717/134 |
| 2003/0005414 A1 | 1/2003 | Elliot et al. | |
| 2003/0093774 A1 * | 5/2003 | Hilton | 717/138 |
| 2004/0054989 A1 | 3/2004 | Harres | |
| 2004/0221268 A1 * | 11/2004 | Nichols et al. | 717/124 |
| 2004/0221273 A1 * | 11/2004 | Sandham et al. | 717/134 |
| 2005/0050389 A1 * | 3/2005 | Chaurasia | 714/15 |

* cited by examiner

*Primary Examiner*—Bryce P. Bonzo

(57) ABSTRACT

A core file derived from an application crash is created. The application belongs to a source platform and is run on a target platform. The application is emulated on the target platform. In response to the crash occurring, detecting whether the crash corresponds to the failure of a process corresponding to the emulated application. The crash process is mediated by intercepting information relating to the failure of the emulated application and writing a core file corresponding to the failure of the emulated application running on the source platform. A dynamic binary translator performs the steps and debugs an emulated application as if it had crashed and dumped a core file on its native platform.

15 Claims, 4 Drawing Sheets

METHOD OF AND APPARATUS FOR CROSS-PLATFORM CORE DUMPING DURING DYNAMIC BINARY TRANSLATION

TECHNICAL FIELD

The present invention relates to failure analysis of software, which belongs to a host computer architecture and is run on a target computer system under an emulation mode via a dynamic binary translator. More particularly, although not exclusively, the invention relates to a method of and apparatus for generating and analyzing a core dump file for software applications during their migration from a source computer system to a target computer system.

BACKGROUND ART

A major problem with transitioning to a new computer architecture is that users usually want applications which had previously been run on the old architecture to be run on the new architecture. Considerable investment in time and money is expended in developing applications and training people in the use of the new architecture. Users are also, understandably, unwilling to change their work tools during a migration to a new computer architecture. Preserving legacy applications can, of course, be achieved by porting the application to the new environment. However, this requires that the source code be accessible and that the application be recompiled specifically for the new platform. If every component of the source code is not available, porting the application is either extremely time-consuming or impossible.

This problem can be solved, to a degree, using binary translation techniques whereby the binary code from the legacy application is automatically converted from one instruction set to another without the need for high-level source code An example of a binary translation system is the Aries product available from Hewlett-Packard. The Aries product assists migration between the PA-RISC (precision architecture reduced instruction set computing) architecture and IA-64 systems running HP-UX. The Aries fast interpreter accurately emulates a complete set of PA-RISC instructions with no user intervention. During interpretation, it monitors the applications execution pattern and translates only the frequently executed code into native IA-64 code at runtime. At the end of the emulation, Aries discards all the translated code without modifying the original application. Therefore, dynamic translation provides fast emulation and preserves the integrity of the emulated PA-RISC application. The Aries dynamic translator also performs Environment Emulation which emulates PA-RISC applications system calls, signal delivery, exception management and threads management.

When performing the translation of an application from a source architecture to a target architecture, it is extremely useful to have access to the same analytical tools as would be available to a programmer developing an application for a specified architecture. A key tool/process is the facility to analyse a core dump file.

A core dump can be defined as printing or the copying to hard disk the contents of a random access memory (RAM) of a machine (e.g., a computer) and all hardware registers at a specific moment, usually when a system failure occurs. A core dump can be thought of as a complete snapshot of the RAM and all hardware registers of the machine and thus represents the state of the machine at the time of the system failure. Thus, a core dump is used mainly for debugging a program during development of an application. In the present context, it is envisaged that core dumps are to be used in the maintenance of emulated applications where the application needs to be debugged so that problems in emulation of the non-native application can be resolved. When an emulated application crashes on a target machine, the core file produced corresponds to that of the emulator. It carries virtually no information relating to the emulated application and thus there is no way for an application developer to analyse the cause of the fault.

It is therefore an object of the invention to provide a method of and apparatus for allowing a user to obtain a core dump image of a software application belonging to a source platform, running on a target platform, with the help of a software emulator, in the situation where the emulated application crashes on the target system.

DISCLOSURE OF THE INVENTION

In one aspect the invention relates to a method of creating a core file derived from an application crash, said application belonging to a source platform and being run on a target platform, comprising the steps of:
emulating the application on the target platform;
in response to the crash occuring, detecting whether the crash corresponds to the failure of a process corresponding to the emulated application; and
mediating the crash process by intercepting information relating to the failure of the emulated application and writing a core file corresponding to the failure of the emulated application running on the source platform.

The mediation process preferably includes the steps of:
suspending all processes except the process handling the creation of the core file;
writing the contents of the emulated applications core file to non-volatile memory.

The mediation process may also include the step of writing out data relating to the emulation state of the application to the core file.

In a preferred embodiment the mediation step includes the step of writing out data relating to the process, data segments, stack segments, shared memory segments, and MMAP memory segments, to the core file.

The mediation step may further include one or more of the steps of writing out information identifying the core version, the process which caused the crash, the host platform kernel version to which the core file belongs, and the name of the application which produced the core file.

The steps of setting up the core file book-keeping parameters preferably include one or more of (1) setting permissions for the core file, (2) specifying the core file name, (3) determining the maximum allowable size for the core file, (4) creating an empty core file, and (5) determining the number of writable segments to be written to the core file.

The method may further including the step of writing out a specified file header to the core file.

The mediation step is preferably invoked when one or more specified signals is received from the target platforms operating system.

In a preferred embodiment, the emulation step includes monitoring book-keeping information required to mediate a crash and creation of a core dump file relating to the emulated application.

Preferably the book-keeping step includes monitoring one or more data relating to the state of the emulated application.

Preferably the data relating to the state of the emulated application includes one or more of (1) the start address of the applications data segment, (2) the size of the applications data segment, and (3) system calls made by the application which specify the state of the emulated application.

Preferably, the method includes the step of implementing a signal handler adapted to intercept the signals which, on receipt of said signals, would cause a core dump in the target platform.

In a further aspect, the invention relates to a binary translator adapted to operate in accordance with the method as hereinbefore defined.

In yet a further aspect, the invention relates to a computer adapted to operate in accordance with the method as hereinbefore defined.

In a further aspect, the invention relates to a memory storing instructions specifying a method of operating a computer as hereinbefore defined.

BRIEF DESCRIPTION OF THE DRAWINGS

The present invention will now be described by way of example only and with reference to the drawings in which.

DETAILED DESCRIPTION OF THE DRAWINGS

Figure 1:
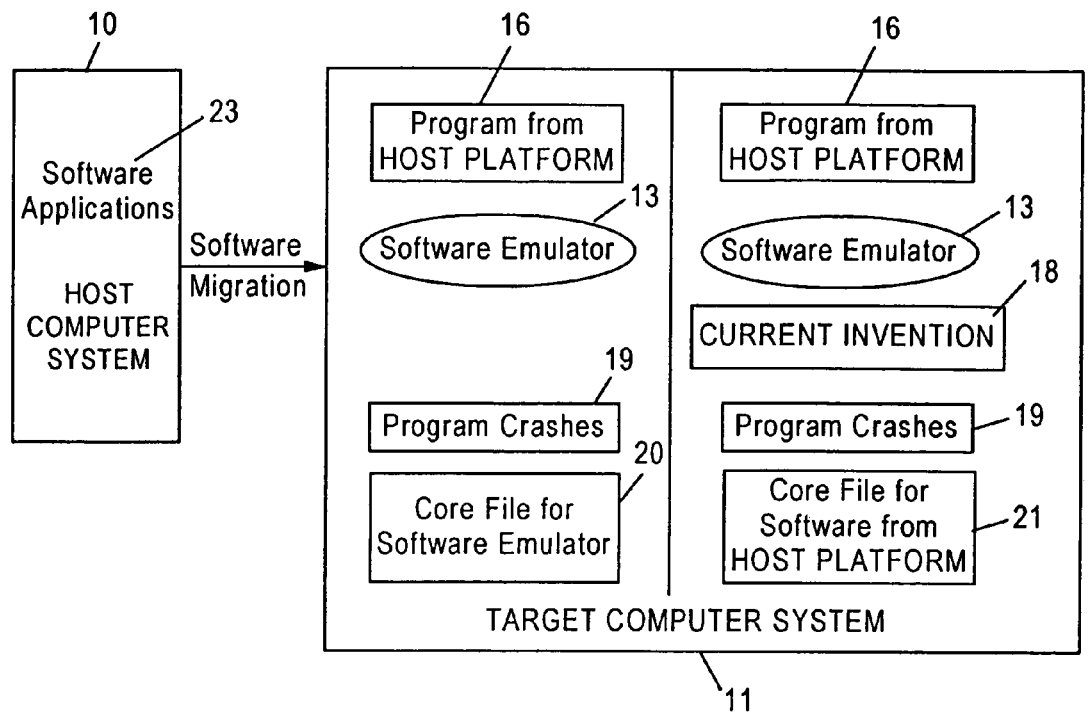
FIG. 1: is an illustration of the process of cross-platform core file generation via a software emulator.

FIG. 1 is a schematic illustration of how an application is migrated to a new host platform. A legacy platform 10 running a legacy software application is shown at the left of FIG. 1. According to techniques known in the art and discussed in the Background portion of this specification, software is conventionally migrated to the target platform 11 and takes the form 16. This host application is run on a software emulator 13 as described briefly above. There are a number of emulation approaches and the example of the applicants Aries system is assumed here.

If the program crashes (operation 19), a core file 20 is written. However, core file 20 corresponds to the RAM and register state for the target machine running the emulator 13, not the host machine. Core file 20 therefore carries virtually no information regarding the state of the host application and its detailed interaction with the emulator 13 and the target platform 11.

A preferred embodiment of the invention functions as shown in the right hand portion of FIG. 1. Here, an intermediary layer 18 is interposed between the software emulator 13 and the post-crash process including program crashes step 29 and core dump file 21 for software from the host platform 10. This intermediate layer 18 manages the creation of a core dump file 21 in such a way that the core file 21 which is produced corresponds to the core file of the original application 23 running on the host platform 10.

Thus the application 10 can be debugged as if it were being run on its native platform 10 when in fact it is being run on an emulator.

According to the presently described embodiment, the intervening layer 18 includes a Corefile Generation Layer (CGL) which, when augmenting a software emulator 13, makes cross-platform core file generation for a host application possible.

In the following description, the core file generation layer is referred to as the CGL and the software emulator, as the Dynamic Binary Translator or DTS. For the purpose of this description, a UNIX® like environment is assumed, although other architectures and operating system environments are possible and the specific operation of the present cross-platform core file generation technique will be clear to one skilled in the art.

A UNIX® like environment provides the following abstractions:
processes
threads
signals
system calls.

On any UNIX® system, a core dump image is generated in response to a process crashing with an un-handled signal. In this situation, the operating system writes out an application core file before terminating the process. This process of writing the corefile is completely internal to the operating system.

To this end, any UNIX® process which receives any of the following signals, and does not have a signal handler installed for the same, is terminated with the generation of a core dump image. These signals are as follows:
SIGFPE
SIGSEGV
SIGBUS
SIGQUIT
SIGILL
SIGTRAP
SIGABRT
SIGEMT
SIGSYS
SIGXCPU
SIGXFSZ
SIGGFAULT The core file which is produced during any such system fault has multiple sections. Each section has a header which identifies the section, its type, file offset, length etc. These sections represent unique information about the processes virtual address space. Some sections of the core file also include information only for identification of the core file. For example, the operating system version, hardware model, which process produced the core file etc. Typically the core file includes the following information
File header.
Version identification section.
The command name that caused the core file to be generated.
proc_info (machine save_state) structure for each thread in the process.
The data segment of the program.
The stack of the program.
Writable shared memory (one core file section for each shared memory object).
Writable private MMAP regions (one core file section for each writable private mmap area).

Figure 2:
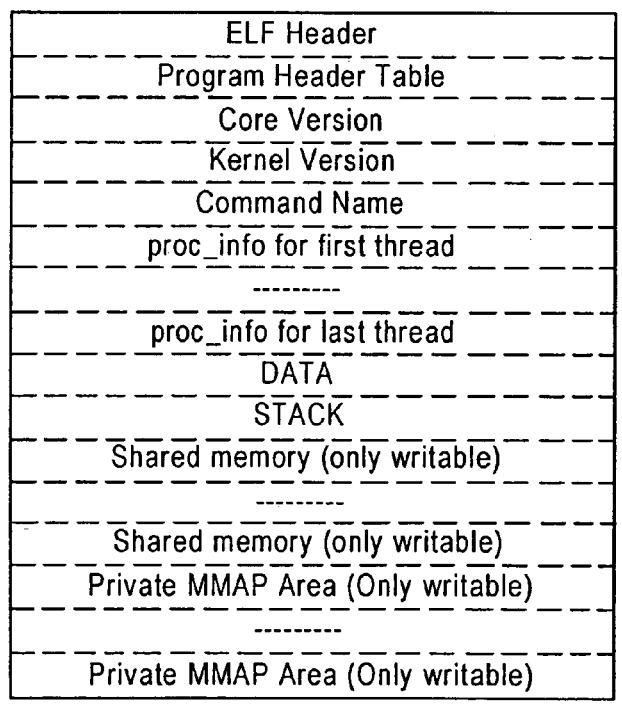
FIG. 2: is an illustration of an exemplary core file layout for a host computer system.

In the present example, the core file layout for the host computer is assumed to be that as shown in FIG. 2. Referring to FIG. 2, an Elf64 core file layout of the host machine has architecture-specific extensions to the Elf file format. This is in accordance with the applicant's assignee's own specifications.

The software emulator or Dynamic Binary Translator (DTS) is a program which is able to automatically run an application, which is native to a host computer system, on a target computer system. That is, a software emulator hosts all of the host computer system software on the target computer system. For the purposes of this description, we will assume the presence of a DTS with certain minimum functionalities as follows.

Whenever software belonging to the host system is run on the target system, such hardware is automatically emulated by the DTS.

The DTS is capable of environment emulation. That is, the DTS is able to detect system calls of a program and either pass the calls on to the operating system of the target computer system operating system, or emulate the calls within the DTS itself. This assumes that the DTS is able to extract the system call arguments and system call return values of the program.

The DTS needs to be able to deliver signals and exceptions to the program. This means that the DTS can detect if the program has a signal handler installed for a given signal and if it has, upon receipt of such a signal the DTS emulates the signal handler of the program. If a signal arrives and the program does not have a signal handler installed for that signal, the DTS calls the Corefile Generation Layer (CGL). In this case, the DTS ensures that the default behaviour for such a signal is to terminate the program with a core dump file.

In relation to the program, the DTS maintains information about each thread in the program as well as information about critical context (register state) of each thread. This includes the per-thread register state, signal mask, program counter etc.

In operation, the DTS determines whether a signal is intended for DTS internal use or if the signal is to be delivered to a program. The DTS makes available to the CGL all the information needed to write out a core file for the emulated program on the target system.

The embodiment of the invention described herein performs three primary functions: making the DTS capable of handling the book-keeping information which is required by the CGL, detecting the conditions under which the DTS should call the CGL, and enabling the CGL to write out the core file for the program. The operation of the cross-platform core dumping method is explained as follows with reference to the exemplary embodiment illustrated in FIGS. 3a and 3b.

As a preliminary point, while the DTS emulates the program on the target computer system, the DTS computer system needs to record the start address of the data segment of the program in memory and the initial size of the data segment as data_start and data_size respectively. The DTS also tracks all brk( )/sbrk( ) system calls made by the program. This is required as the usage by the program of malloc( ) and similar library routines would dynamically change the end of data segment address. The following pseudocode can track and record the programs brk( )/sbrk( )system calls.

```
Initially record data_endaddr = data_start + data_isize
If (brk/sbrk system call succeeds)
    then
        extract endaddr parameter from brk( )/sbrk( )
        use endaddr to update data_endaddr global variable.
```

The DTS also records the basename of the program as app_basename as well as tracking the mmap( ) system calls of the program. One method of tracking and recording private writable mmap( ) system calls is:

```
if (mmap system call succeeds) and
        (mmap does not correspond to mmap of TEXT segment)
    then
        extract protect, flags, address, length arguments from mmap( )
        create a node with extracted parameters
        add the node to a global mmap_list_p linked list.
```

The DTS also needs to track the mprotect( ) system calls of the program. This is required as the program might zero out access permission on some pages in private writable mmap regions. The following method can be used to track and record mprotect( ) system calls.

```
If (mprotect system call succeeds)
then
    extract protection, length and address arguments from mprotect( )
    create a node with extracted parameters
    add the node to a global mprotect_list_p linked list.
```

The DTS also tracks a number of other systems calls of the program. These calls can be enumerated as follows with suitable pseudocode methods given.

munmap( ) System Calls.

```
If (munmap system call succeeds)
then
    extract address and length parameters from munmap( )
    based on extracted parameters check if any node in mmap_list_p
    and mprotect_list_p matches to this munmap( ) ?
If yes, then remove the node from corresponding list.
``` shmat( ) System Calls.

```
If (shmat system call succeeds)
then
    extract shmid, shmaddr and shmflags parameters from shmat( )
    create a node with extracted parameters and initialize the length
    shmlen of each segment to zero (to be filled later).
    add the node to a global shm_list_p linked list.
``` shmdt( ) System Calls.

```
if (shmdt system call succeeds)
    then
        extract shmaddr parameter from shmdt( )
        search shm_list_p for a node that matches shmaddr;
        if a node is found, then delete it.
``` shmctl( ) System Calls.

```
If (shmctl system call succeeds)
    then
        extract shmid and cmd parameters from shmctl( )
        if (cmd == IPC_RMID)
```

-continued

```
    then
        search shm_list_p for a node that matches shmid.
        If a node is found, then delete it
```

Figure 3A:
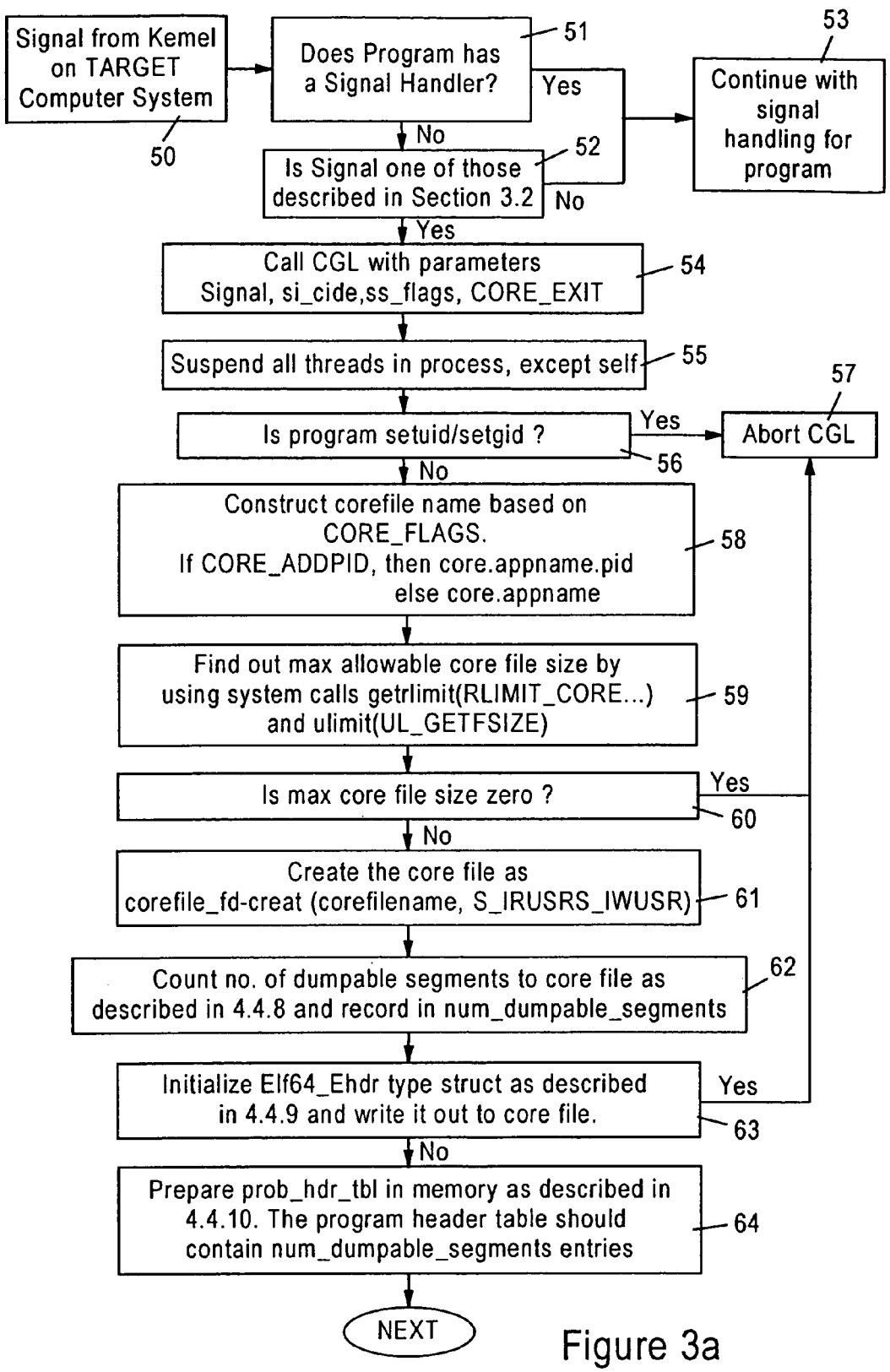
FIGS. 3a, 3b and 3c: together are a block diagram of an example of the operation of a core file generation layer.
Figure 3B:
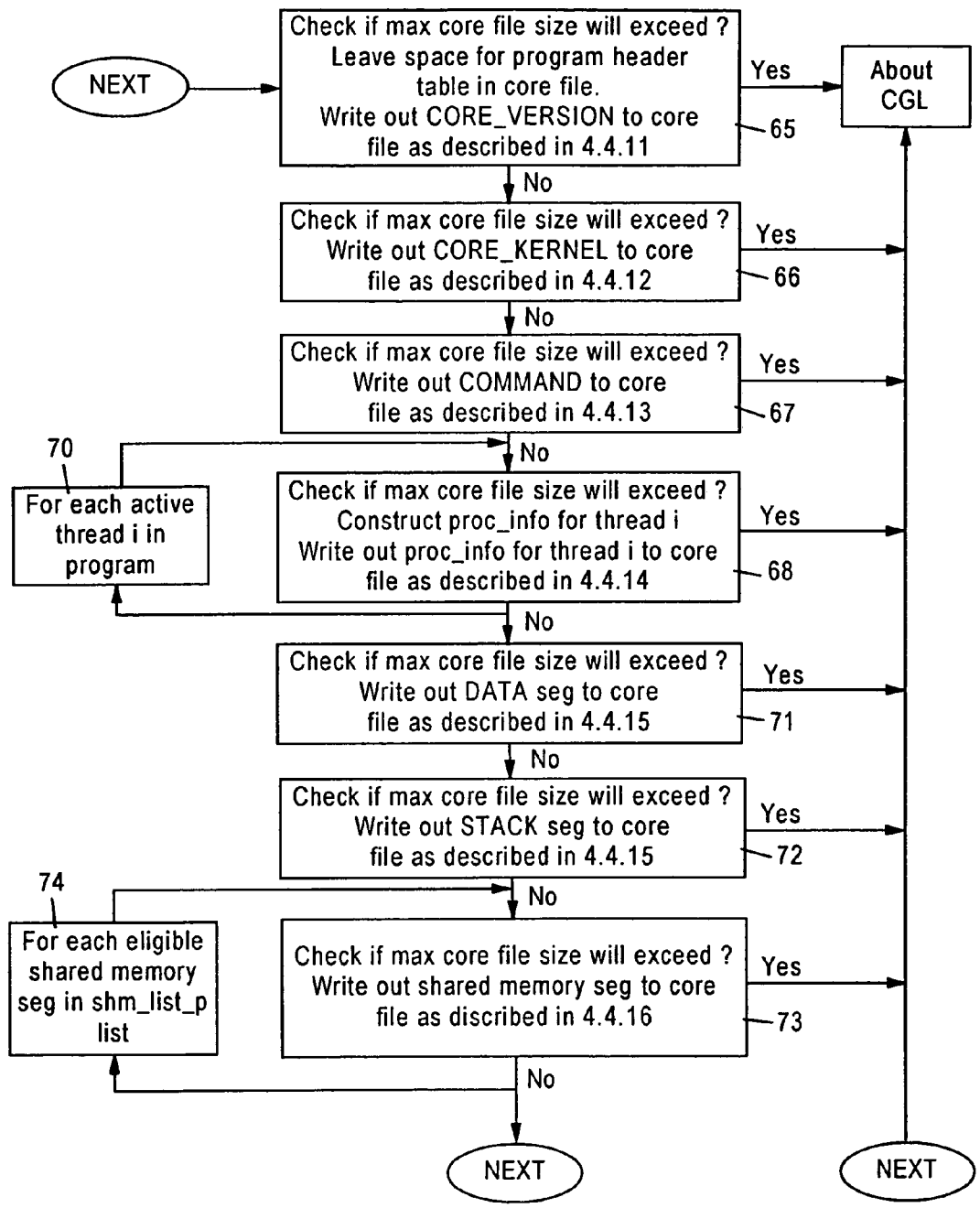
Figure 3C:
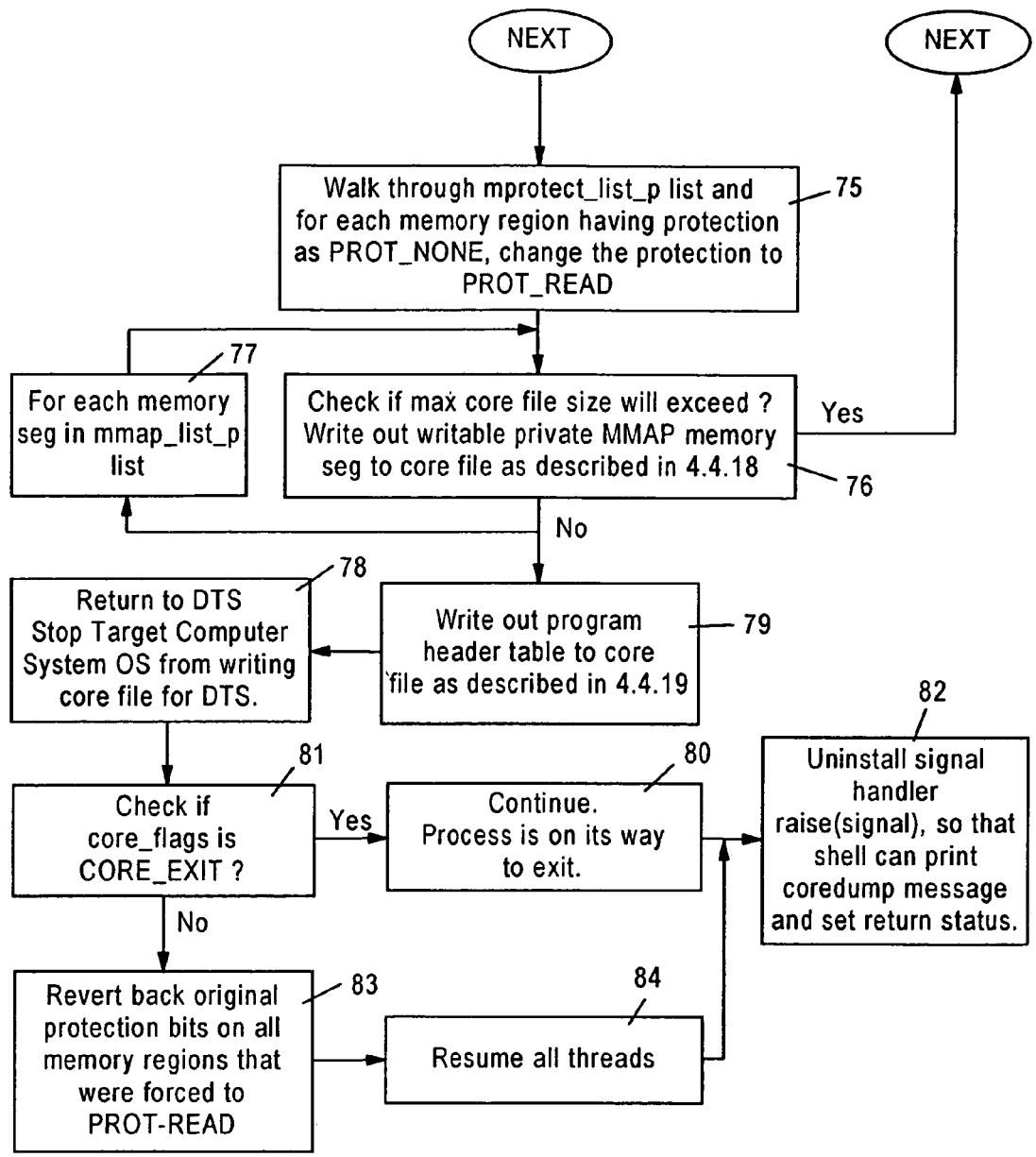

The DTS also controls the stack of the program. To this end, the DTS records the start and end addresses of the stack of the program as stack_start and stack_end respectively. The DTS make this information available to the CGL and updates the stack_start and stack_end appropriately as the programs emulation progresses. Referring to FIGS. 3a and 3b, the DTS installs its own signal handler for all signals, having a default behaviour that terminates the process with a core dump image. These signals which cause this behaviour are enumerated above.

Here, the reference numerals refer to the steps or operations in the method as shown in FIGS. 3a and 3b. For the CGL to be called by DTS it is necessary that a default signal handler be registered by the software emulator with the target computer system OS. The presence of the DTS signal handler (operation 51) causes the target computer system operating system to send the signal to DTS (operation 52). The signal handler, upon receipt of the signal, calls the CGL (operation 54) as described as follows.

The following method can be used to determine when and how the DTS should call the CGL.

```
If (signal is one of    SIGFPE, SIGSEGV, SIGBUS, SIGQUIT, SIGILL, SIGTRAP,
                        SIGABRT, SIGEMT, SIGSYS, SIGXCPU, SIGXFSZ, SIGGFAULT)
    and
    (signal is to be delivered to program)
    and
    (for signal, program's signal handler == SIG_DFL)
then
    block all signals from arriving after this point
    call CGL as error = CGL (signal,
                            si_code,
                            processor dependent save_state flags,
                            core flags)
    if (error occurred)
    then
        print out error message and abort DTS.
    else
        stop target computer system OS from writing core file for DTS, by
        zeroing out the maximum size of core file. On some UNIX ® flavors
        setrlimit(RLIMIT_CORE, . . . ) will do.
```

The CGL writes out the core file in a manner which is similar to how the HOST computer system's operating system would write out the core file for the program.

The following method forms the backbone of this embodiment of the CGL design and is described in detail with reference to FIGS. 3a and 3b.

The DTS initially calls the CGL with the parameters: signal, si_code, ss_flags and core_flags (operation 54). For security reasons core files for the program that are setuid and/or setgid are not written. The following method can be used in this situation.

```
If getuid( ) != geteuid( ) or getgid( ) != geteuid( )
then
    do not write core file for the program.
    Abort CGL silently and let target computer system write out core
    file for DTS. [See operation 57 in FIG. 3a]
```

All other threads in the process are suspended except the present thread (operation 55). The CGL can optionally write out the core file as core.appname (operation 58) to differentiate the programs core files from DTS's own core files according to the following method.

```
If (core_flags == CORE_ADDPID)
then
    corefilename = string concatenation of core.app basename.getpid( )
else
    corefilename = string concatenation of core.app_basename
```

The next step is that the DTS determines the maximum allowable core file size for the program 59.

```
Use system call getrlimit (RLIMIT_CORE, . . . ) to get max core file
size.
Use system call ulimit (UL_GETFSIZE) to get max size of file that this
process can create.
    Record max_corefile_size = least of (max core file size, max size of
file)
```

This is done with the proviso that the DTS does not create a new core file or truncate an existing core file if max_corefile_size is 0 (operation 60).

```
if ( max_corefile_size == 0)
then
    abort CGL silently without creating core file or truncating
    existing core file.
```

The DTS then creates a file corefilename in the current working directory and gives the user only permission to access the corefile (operation 61). If a corefile already exists, its length is truncated to zero. The file descriptor for writing out the core file contents is then recorded.

```
    corefile_fd=creat (corefilename,
            S_IRUSER|S_IWUSER)
```

Then the number of segments to be written to core file is counted as below (operation 62). This is required, as space needs to be reserved for the program header table after the ELF file header at the start of core file.

```
Counting num of writable shared memory segments
    Use gettune( ) or equivalent system call to find if target computer system
    OS allows writing of read-only and/or read-write shared memory segments to
    core file.
    if no, then no shared memory segment will be written to core file. In this
    case, initialize num of writable shared memory segments to zero.
    if yes, then walk through shm_list_p and use system call pstat_getshm( ) to
    extract attributes corresponding to each shared memory segment represented
    by a node in list shm_list_p.
    For each eligible shared memory segment, update the length of segment in
    shm_list_p node.
    Mark the eligible nodes for writing to core file.
    Count the number of eligible nodes in shm_list_p.
Counting num of writable private mmap memory segments
    Walk through mmap_list_p list and for each node check if protect field is
    PROT_WRITE and flag field is MAP_PRIVATE.
    Mark each eligible node for writing to core file.
    Count the number of eligible nodes in mmap_list_p.
num_dumpable_segments = 1 segment for core file version +
                        1 segment for core file identification +
                        1 segment for command name +
                        num of active threads in process +
                        1 segment for data +
                        1 segment for stack +
                        num of writable shared memory segments +
                        num of writable private mmap memory segments
```

The ELF file header is the written out to the core file (operation 63) according to:

```
Initialize a structure elf64_ehdr of type Elf64_Ehdr as below
    Initialize all architecture and data model specific fields according to
    HOST computer system.
    Initialise elf64_ehdr.e_type = ET_CORE
    Initialize elf64_ehdr.e_phnum = num_dumpable_segments
    Initialize elf64_ehdr.e_phoff = sizeof(elf64_ehdr)
Write out elf64_ehdr to core file
    write (corefile_fd, &elf64_ehdr, sizeof(elf64_ehdr)
```

A program header table is to be written after the elf64_ehdr in the core file. However, the program header table will be populated with each segment that is written to core file. Therefore, the DTS keeps the program header table in memory and writes it out to the core file once all the segments are written (operation 64).

```
Declare program header table as
    Elf64_Phdr prog_hdr_tbl[num_dumpable_segments] = {0}
```

The CORE VERSION is then written to core file (operation 65). This is generally a constant integer and is specific to a computer system.

```
Leave out space for program header table in core file
    lseek (corefile_fd, sizeof(elf64_ehdr)+sizeof(prog_hdr_tbl),
    SEEK_SET)
check_error()
Write out CORE VERSION to core file
    write (corefile_fd, &Elf64_CORE_VERSION, sizeof(int)
Update prog_hdr_tbl as
    prog_hdr_tbl[0].p_type   = PT_HP_CORE_VERSION
    prog_hdr_tbl[0].p_offset = corefile offset at which
    CORE VERSION was written
    prog_hdr_tbl[0].p_filesz = sizeof (Elf64_CORE_VERSION)
    prog_hdr_tbl[0].p_memsz  = sizeof (Elf64_CORE_VERSION)
```

The CORE_KERNEL version is then written to the core file. The CORE KERNEL version specifies to which computer system this core file belongs. The CORE KERNEL is initialized and written out to core file as described below. This segment typically includes what the "uname -a" command shows on the HOST computer system.

The system then prepares a structure of type utsname for the host computer system and initialize the system fields as the host computer system would have initialized it.

```
check_error( )
Write out utsname structure to core file at current file offset.
Update next entry in prog_hdr_tbl, with p_type field initialized as
PT_HP_CORE_KERNEL
```

The COMMAND name is then written to the core file (operation 67). This indicates the basename of the application that produced the core file.

```
check_error( ); Write out app_basename to core file at current file offset.
    Update next entry in prog_hdr_tbl, with p_type field initialized as
    PT_HP_CORE_COMM.
``` proc_info is written out for each thread to the core file (operation 68). The proc_info structure specifies the machine register context along with the signal name, si_code, ss_flags etc. This structure is specific to HOST computer system.

```
for each active thread i in process
do
    construct proc_info structure for thread i, based on critical register
    context supplied by DTS and signal, si_code, ss_flags
    (parameter for CGL).
    This is similar to machine save_save on HOST computer system.
    check_error( )
```

-continued

```
Write out proc_info for thread i to core file at current offset
Update next entry in prog_hdr_tbl with p_type field initialized as
  PT_HP_CORE_PROC
done
```

The DATA segment is then written out to the core file (operation 71):

```
data_seg_size = Roundup_on_next_page_boundary(data_endaddr – data_start)
check_error( )
Write out data_seg_size bytes from data_start to corefile.
Update next entry in prog_hdr_tbl with p_type field as PT_HP_CORE_DATA
```

The STACK segment is then written out to the core file (operation 72):

```
stack_seg_size = Roundup_on_next_page_boundary(stack_end – stack_start)
check_error( )
    Write out stack_seg_size bytes from stack_start to corefile.
    Update next entry in prog_hdr_tbl with p_type field as PT_HP_CORE_STACK
```

The Shared memory segments are then written out to the core file (operation 73):

```
for each eligible entry i in shm_list_p
do
    check_error( )
    extract shmlen and shmaddr for shared memory segment from node i
    write out shmlen bytes to core file from address shmaddr
    Update next entry in prog_hdr_tbl with p_type field as PT_HP_CORE_SHM
done
```

The writable private MMAP memory segments are written out to the core file (operation 76). It is possible that the program has zeroed out access permissions on some pages in the writable private mmap memory regions. To write the core file, the DTS makes all such PROT_NONE pages have at least PROT_READ page protection.

```
For each entry i in mprotect_list_p
do
    extract protection, length, address from node i
    if (protection & PROT_READ == 0)
        mprotect (address, length, PROT_READ)
done
for each eligible entry i in mmap_list_p
do
    check_error( )
    extract address and length for shared memory segment from node i
    write out length bytes to core file from address address.
    Update next entry in prog_hdr_tbl with p_type field as PT_HP_CORE_MMF
done
```

The program header table is written out to the core file (operation 79). By now all dumpable segments have been written to the core file.

```
lseek (corefile_fd, sizeof(elf64_ehdr), SEEK_SET)
write (corefile_fd, &prog_hdr_tbl, sizeof(prog_hdr_tbl))
```

The host computer operating system may require certain segments in the core file to have a specific (4 or 8 byte) alignment. While writing the above segments, care needs to be taken for alignment of segments in the core file. If a start offset of a segment is not correctly aligned, then some space is left and writing is started at the next aligned offset.

Before writing out a segment to the core file, the DTS checks to see if writing this segment would cause the core file size to exceed max_corefile_size. If this happens, the error is flagged and the CGL aborts. In such case the segment is not written to the core file. This is done by a call to the function check_error( ).

After the CGL has finished writing the core file for the program, the CGL needs to inform the TARGET computer system operating system not to write out the core file for the DTS itself (operation 78).

---

Through getrlimit(RLIMIT_CORE, . . . ) get the current max core file size.
Modify the soft limit for maximum core file size as zero.
    Through setrlimit(RLIMIT_CORE, . . . ) set the max
    core file size to zero.

---

If the caller of the CGL has specified that the process is to be continued (core_flags !=CORE_EXIT) after writing core file for program, resume all threads in the process and continue (operation 80).

---

```
If (core_flags & CORE_EXIT)
    then
        no need to resume all threads in program, as process is anyway going to exit.
    else
        revert original protection id on all mprotect'ed regions
        resume all threads in process
    raise(signal) // Since operation 78 has set core file size to zero. This will cause
    underlying
            // shell to print standard coredump error message and set exit status.
```

---

This terminates at steps 83 and 84 with the signal handler being uninstalled at operation 82.

Thus, in effect, the emulation system continues with the apparent system fault causing a core file to be created 'gracefully'. The core file represents the host application running on the target machine and thus can be used for debugging and analysis purposes.

Although the invention has been described by way of example and with reference to particular embodiments it is to be understood that modification and/or improvements may be made without departing from the scope of the appended claims.

Where in the foregoing description reference has been made to integers or elements having equivalents, then such equivalents are herein incorporated as if individually set forth.

The invention claimed is:

1. A method of creating a core file derived from an application crash, said application belonging to a source platform and being run on a target platform comprising the steps of:
   emulating the application on the target platform;
   responding to the crash occurring by detecting whether the crash corresponds to the failure of a process corresponding to the emulated application;
   mediating the crash process by intercepting information relating to the failure of the emulated application and writing a core file corresponding to the failure of the emulated application running on the source platform.

2. A method of creating a core file as claimed in claim 1 wherein the mediation process includes the steps of:
   suspending all processes except for the process handling the creation of the core file; and
   writing the contents of the emulated applications core file to non-volatile memory.

3. A method of creating a core file as claimed in claim 1 wherein the mediation process includes the step of writing out data relating to the emulation state of the application to the core file.

4. A method of creating a core file as claimed in claim 1 wherein the mediation step includes the step of writing out data relating to the process, data segments, stack segments, shared memory segments, and MMAP memory segments, to the core file.

5. A method of creating a core file as claimed in claim 4 wherein the mediation step further includes one or more of the steps of writing out information identifying the core version, the process which caused the crash, the host platform kernel version to which the core file belongs, and the name of the application which produced the core file.

6. A method of creating a core file as claimed in claim 2 including the steps of setting up the core file book-keeping parameters including one or more of setting permissions for the core file, specifying the core file name, determining the maximum allowable size for the core file, creating an empty core file, and determining the number of writable segments to be written to the core file.

7. A method of creating a core file as claimed in claim 6 further including the step of writing out a specified file header to the core file.

8. A method of creating a core file as claimed in claim 1 wherein the mediation step is invoked in response to one or more specified signals being received from the operating system of the target platform.

9. A method of creating a core file as claimed in claim 1 wherein the emulation step includes monitoring book-keeping information required to mediate a crash and creating of a core dump file relating to the emulated application.

10. A method of creating a core file as claimed in claim 9 wherein the book-keeping step includes monitoring one or more data relating to the state of the emulated application.

11. A method of creating a core file as claimed in claim 10 wherein the data relating to the state of the emulated application includes one or more of the start address of the data segment of the application, the size of the data segment of the application, and system calls made by the application which specify the state of the emulated application.

12. A method of creating a core file as claimed in claim 1 including the step of implementing a signal handler adapted to intercept the signals which, on receipt of said signals, would cause a core dump in the target platform.

13. A binary translator adapted to operate in accordance with the method of claim 1.

14. A computer adapted to operate in accordance with the method of claim 1.

15. A memory storing instructions specifying a method of operating a computer as claimed in claim 1.

* * * * *